United States Patent [19]

Schiemann

[11] 3,724,981
[45] Apr. 3, 1973

[54] APPARATUS FOR MAKING A CONTAINER OF PLASTIC MATERIAL

[76] Inventor: Wolfram Schiemann, Eugen-Nagele Straase 17, 714 Ludwigsburg, Germany

[22] Filed: Nov. 16, 1971

[21] Appl. No.: 199,279

[52] U.S. Cl............425/109, 425/326, 425/DIG. 5, 425/DIG. 58
[51] Int. Cl. ............................................B29d 23/03
[58] Field of Search.......425/326, 387, 109, DIG. 58, 425/DIG. 5, 215, 249, 324

[56] References Cited

UNITED STATES PATENTS

| | | |
|---|---|---|
| 3,169,276 | 2/1965 | Hugentobler................425/DIG. 5 |
| 3,264,684 | 8/1966 | Moslo..........................425/DIG. 5 |
| 3,342,916 | 9/1967 | Peters................................425/324 |
| 3,499,071 | 3/1970 | Hurst.................................425/326 |
| 3,575,949 | 4/1971 | Humphrey.........................425/326 |
| 3,640,672 | 2/1972 | Starr..................................425/326 |

*Primary Examiner*—H. A. Kilby, Jr.
*Assistant Examiner*—Michael O. Sutton
*Attorney*—M. Robert Kestenbaum

[57] ABSTRACT

The apparatus makes a blow-moulded plastic container having three handles. Blow-moulding dies have open-edged recesses which are not undercut in the direction of the dividing plane between the dies. A separately moulded outer handle is insertable in each recess and becomes permanently welded to the container walls. Two sliding devices below the dies have recesses for forming the central handle and are movable towards each other and towards the dies, closing off central recesses therein.

8 Claims, 10 Drawing Figures

APPARATUS FOR MAKING A CONTAINER OF PLASTIC MATERIAL

The invention relates to an apparatus for making a container of plastics material having three handles also made of plastics material.

The 20 liter fuel can or gerry can made of sheet metal has been known for approximately forty years and used with great success in many countries for civilian or military purposes. Its upper face slopes down in two stages towards the outlet. Welded to its upper face is a stamped sheet metal plate which spans the approximately horizontal stage of the upper face and is provided with three horizontal handles extending parallel to one another. The central handle is therefore necessary in order that the can may be carried as an individual container and in this connection it is vertically suspended. This would not be the case if the central handle were staggered to the side. When viewed from above, the two lateral handles are in alignment with the side walls of the container. If the lateral faces of two containers lie closely adjacent to one another, the two outer adjacent handles of the two containers can be gripped by a single hand and therefore two containers can be carried by one hand. One person is therefore easily capable of carrying four cans owing to this handle arrangement. However, the three handles, and at least the two outer handles, are also a necessary feature for the stackability of the cans, since they form a substantial part of the face supporting the can located above. In addition the two outer handles act as identical hand holds if two people are carrying the can between them or are both emptying it, for example. The three handles also reinforce the upper area of the can which is subjected to great stress. In particular the three handles are considerably more capable than a single handle or two handles of distributing the great stresses which occur if a container filled with drinking, water, milk, petrol or other such liquids is dropped by parachute and when the jerking movement caused by the opening of the parachute checks the fall of the can or cans suspended from the parachute cords. The cans must be able to withstand these stresses at temperatures of minus 30° to plus 70°C and even after several years of use.

On the other hand, the blow moulding of containers from plastics material has been known for many years. It is known that plastics containers are substantially lighter than sheet metal containers, do not make a clattering noise, do not corrode and, above all do not have to be regenerated like the sheet metal containers. After a few years the regeneration of sheet metal containers alone costs as much as the sheet metal container cost when new. Despite these known advantages and the incentive caused by mass production, it has hitherto been impossible to provide a plastics container which, in spite of the considerably variable properties of plastics material, could replace the known metal jerry can, particularly the 20 liter version.

The problem underlying the invention is to provide an apparatus which permits the blow moulding of a plastic container which in its outer form resembles the known metal containers of this type as well as having the same versatility, can be mass produced and offers an economically acceptable solution.

According to the invention this problem is solved in that, below a blowing head or die head which extrudes a suspended hot tube of plastics material and to the side of said tube, blow moulding sections for manufacturing a fluid container of the 20 liter type are provided with three parallel handles arranged in juxtaposition, in that open-edged recesses which are not undercut in the direction of the dividing plane of the blow moulding sections are produced in the lower inner marginal area of the blow moulding section, a separately moulded outer handle with a plate being insertable into each of said recesses at a temperature at which the inner face of the plate is permanently welded to the hot extrudate, in that the handle plate, its outer face following the outer face of the container, extending from one end of the outer handle to the other and also extending a little further along the side wall and the upper side of the container, in that the material of the extrudate is identical to that of the handle plates at least with regard to welding properties at blow moulding temperatures, in that below each of the blow moulding sections there is provided a half recess for the outlet and the central handle section, in that below the blow moulding sections there are provided two sliding devices, which are substantially symmetrical with the dividing plane and can be jointly operated subject to the closing of the blow moulding sections and the moulding time, each of said sliding devices comprising a sliding plate, of which the upper sections facing one another are provided with a first recess for forming the central handle and an upper second recess for squeezing off and receiving the surplus extrudate between the central handle and the upper side, in that the upper faces of the sliding plates can be moved fully towards one another between the outer handles and the tubular material flattened by the closing operation and as far as the upper side of the container and then when blow moulding commences, and in that the sliding plates can be stopped or locked in this position.

Other advantages and features of the invention are shown in the following description of a third embodiment.

Figure 4:
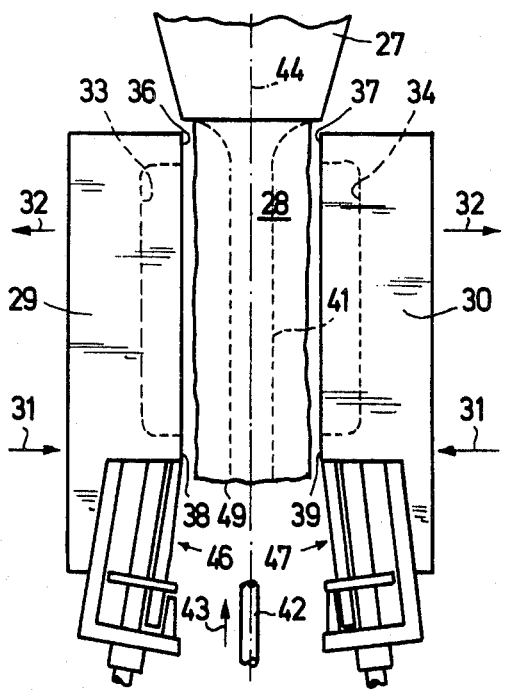
Figure 5:
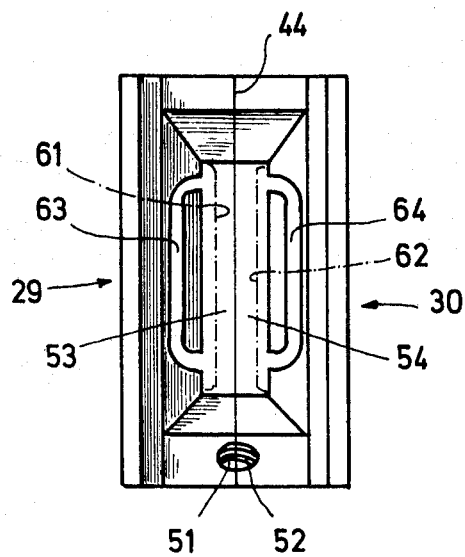
Figure 6:
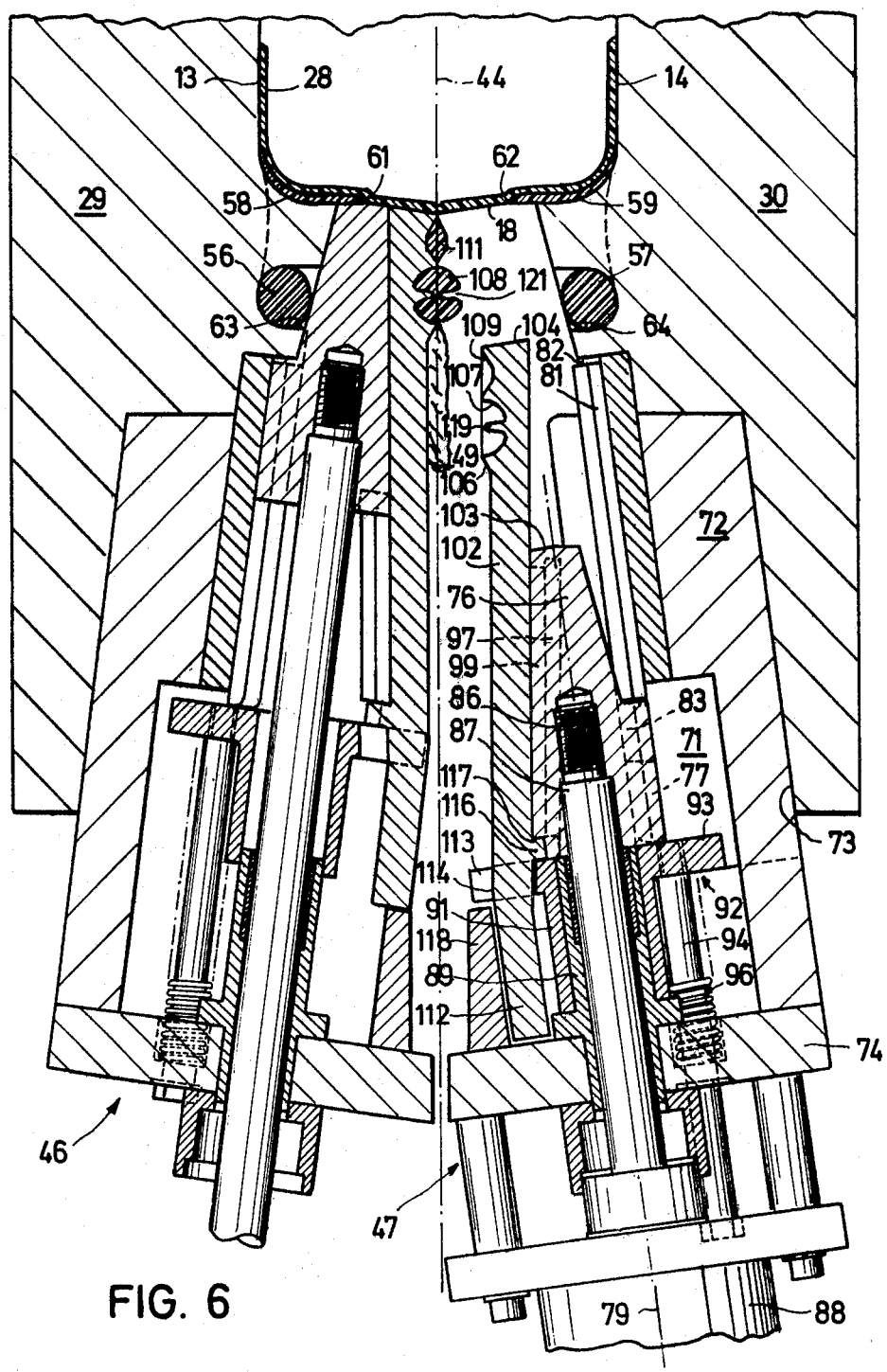
Figure 7:
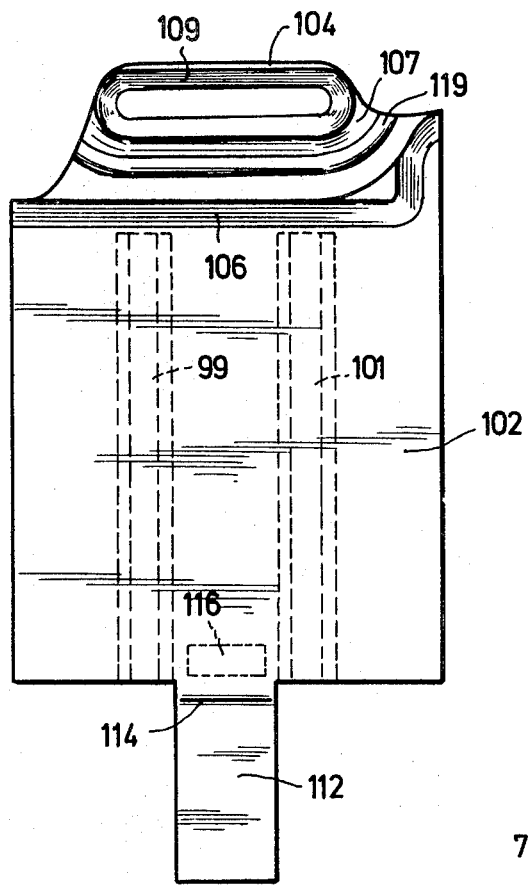
Figure 8:
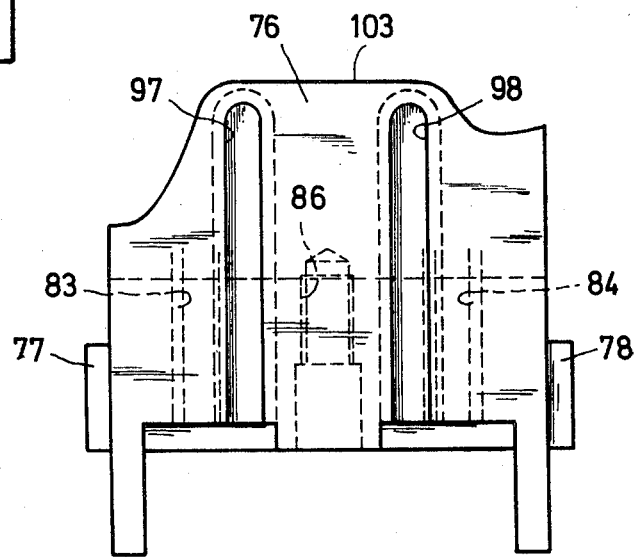
Figures 9, 10:
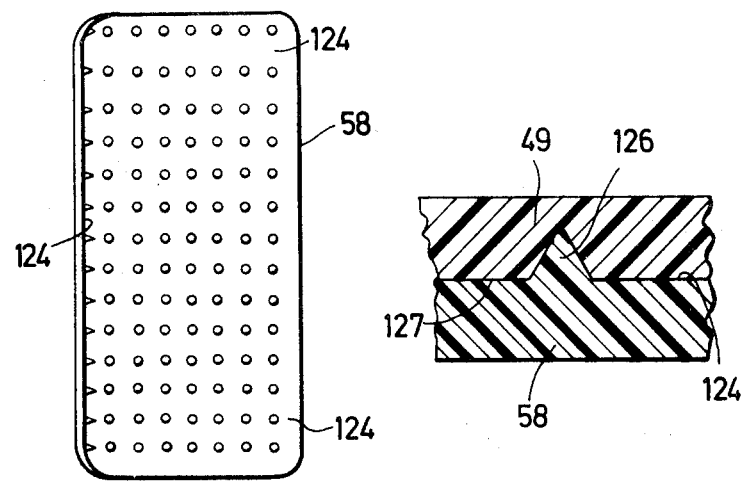

FIG. 4 shows a greatly simplified side view of a machine showing a tubular form of extrudate, FIG. 5 shows a simplified underneath view of two closed split dies for blow moulding, FIG. 6 shows a vertical section through the lower area of the blow moulding sections when closed and through the sliding devices in two different working positions, FIG. 7 shows a sliding plate, FIG. 8 shows a plan view of the wedge or key, FIG. 9 shows a view under the side plate of a handle, FIG. 10 shows a cross-section through a small cone formed on a handle plate and through a welded-on outer wall.

A container 11 in the form of the known 20 liter jerry can comprises, interalia, side walls 13, 14 reinforced by grooves 12, a front wall 16, a rear wall 17 and an upper side 18. The upper side 18 has a horizontal section 19 which leads via an almost vertical inclined face 21 into a second approximately horizontal section 22. In side view this horizontal section 22 rises into a rounded section 23 and then leads into a steeply inclined face 24 out of which the outlet 26 projects diagonally upwards.

As shown in FIG. 4 a stationary blow-moulding head 27 extrudes a tube 28 of hot extrudate. The blow-moulding head 27 is supported by a frame (not shown). Also on this frame two split dies 29, 30 can be moved in a straight line in the direction of the arrows 32 when opening. On the sides directed towards one another recesses 33, 34 which complete the blow moulding apparatus when closed are produced in the split dies, 29 30 are provided with cutting edges 36, 37 which cut off the extrudate 28 when closing and keep it in a suspended position sufficiently long for the blow moulding operation in the center of the recesses 33, 34. At the bottom of the split dies 29,30 there are also provided cutting edges 38, 39 which when closing squeeze off the extrudate 28 at the bottom, but, as will be explained later, not over its entire width. When the mould is closed the extrudate 28 is flattened, as shown by the broken lines 41. However, in this connection the inner walls of the extrudate 28 do not come into contact with one another and the distance between these inner walls is such that the mandrel 42 can be introduced from below in the direction of the arrow 43. Two devices 46, 47 which are symmetrical relative to the dividing plane 44 are attached to the lower parts of the split dies, 29, 30 and can be moved therewith. As seen in FIG. 4, the lower edge 49 of the tube 28 is substantially lower than the cutting edges 38,39.

The lower sections of the split dies 29, 30 are provided with, respectively, half recesses 51,52 for the outlet 26 in which recesses the mandrel 42 is also located during blow moulding, said mandrel having been brought into its upper working position prior to the closing of the dies 29, 30. In addition two recesses 53,54 are provided for producing the handle section. The devices 46 and 47 have been omitted from FIG. 5 for the sake of clarity.

Each handle 56, 57 together with a moulded-on handle plate, 58,59 can be inserted into the lower section of each split die 29,30, and the handle plates 58,59 are located at the bottom of the recesses 33,34, but their inner edges 61,62 projects slightly into the recesses 53,54 as can be seen in FIG. 6 and as shown by dot-and-dash lines in FIG. 5. The handles 56, 57 made of a solid material lie in open edged recesses 63,64 which are not undercut in the direction of the dividing plane 44 and which in the vicinity of the handle roots 66,67,68,69 lead into the bottom of the recesses 33,34. The handles 56, 57 must bear fully against the handle plates 58,59 since the moulding pressure is approximately 10 atmospheres and these parts should not be moved during blow moulding and cooling. As can be seen in FIG. 6, the walls of the recesses 63,64 are designed to taper slightly outwards in order to facilitate the moulding of the ends.

FIG. 6 shows the device 46, in a working position and the device 47 in a withdrawn position following the blow moulding of a container, but before the split dies 29, 30 have been opened. The devices 46, 47 are synchronized in operation. Since both devices are identical in design, only the device 47 will be described first. It comprises inter alia, two lateral framed plates 71 which are rigidly connected to the die section 30 and extend parallel to and some distance from one another. A bed 72 which is also rigidly connected to the die section 30 is located between the two frame plates 71. As is shown in the drawings, these parts lie in a large angular recess 73 in the lowest section of the split die 30. A supporting plate 74 is welded along its outer edge to the bed 72. A wedge or key 76 can be moved by two side projections 77,78 into inner grooves of the frame plate 71 along the longitudinal axis 79 which lies at an acute angle to the upper side 18 of the container 11. In addition the wedge 76 is guided to the left and right of its center through two-T-shaped rails 81 which also extend parallel to the longitudinal axis 79 and are screwed rigidly to the bed 72, and extend with a projection into a correspondingly shaped recess 82 of the die section 30. The T- shaped rails 81 pass through T-shaped grooves 83, 84 of the wedge 76. This four-point support produced by the projection 77,78 and the T-shaped grooves 83,84 is necessary because of the great pressure to which the wedge 76 is subjected when moving into the closing position. The center of the wedge 76 is provided with a blind hole thread 86 into which is screwed the front end of the rod 87 which is co-axial with the longitudinal axis 79 and can be moved back and forth by a cylinder 88 and a piston operated by compressed air. This cylinder 88 is, as shown, rigidly screwed to the supporting plate 74. The rod 87 is carried through a telescopic bush 89 which is rigidly connected to the supporting plate 74, is co-axial with the longitudinal axis 79 and extends upwards from the supporting plate for a considerable distance. The outer face of the telescopic bush 89 serves as a guide for the inner bore of the flange 91 of a ring sleeve 92. A stay bolt 94 which extends through a corresponding recess in the supporting plate 74 is screwed into the collar 93 of the ring sleeve 92 so that it is suspended downwards. A helical compression spring 96 which encloses the stay bolt 94 is tensioned between the supporting plate 74 and the collar 93. As shown in the right hand section of FIG. 6, the upper side of the collar 93 bears against the lower side of the wedge 76 when in this position.

Two more T-shaped grooves 97,98 which extend parallel to the dividing plane 44, support T-shaped rails 99,101, and open downwards, are produced in the inner face of the wedge 76. T-shaped rails 99,101 are rigidly connected to a sliding plate 102 which as shown in the drawing projects a considerable distance above the upper face 103. As seen in FIG. 8, the face 103 has the same shape as required by the upper side 18 of the container 11. As is shown by a comparison between FIGS. 7 and 8, the face 104 of the sliding plate 102 is moulded precisely to suit this purpose. Following a ledge 106 which projects towards the center and consequently has a thicker section in the upper area of the sliding plate 102, a recess 107 which follows the shape of the central handle 108 is produced in this section, and in addition there is provided a recess 109 which cuts off and receives the surplus material of the tubular extrudate 18 between the section 22 of the container 11 and the central handle 108. The material 111 is therefore waste material. Over the greater part of its length the sliding plate 102 extends parallel to the dividing plane 44 and only a stem 112 in its lower section extends parallel to the longitudinal axis 79. This stem 112 also passes through a recess 113 in the collar 93. The bend 114 is provided in the vicinity of this collar. Above the bend 114 on the outer side of the sliding plate 102 there is provided a transverse rib 116 which bears against both the collar 93 and the lower face 117 of the wedge 76.

Figure 1:
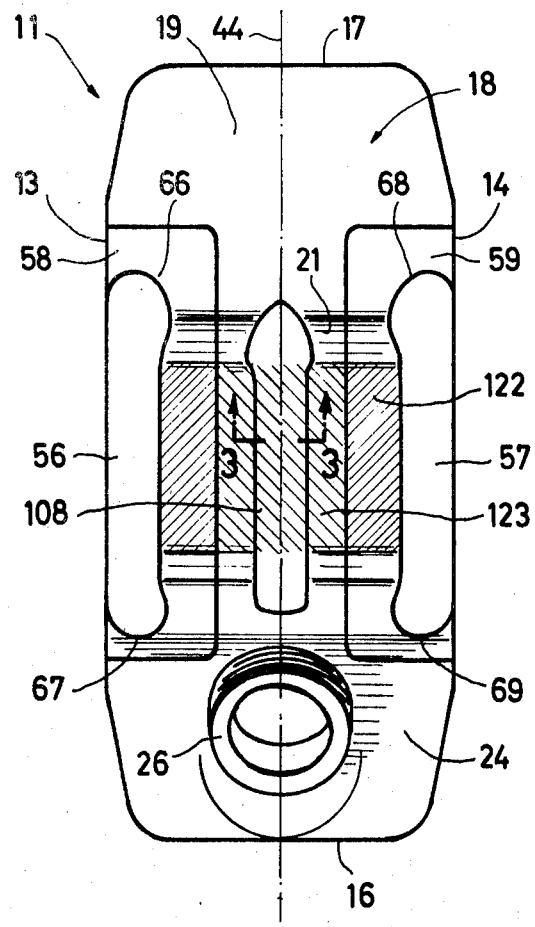
FIG. 1 shows a plan view of a standing container according to the invention.
Figure 3:
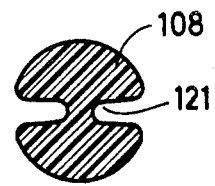
FIG. 3 shows a section along the line 3—3 in FIG. 1.
Figure 2:
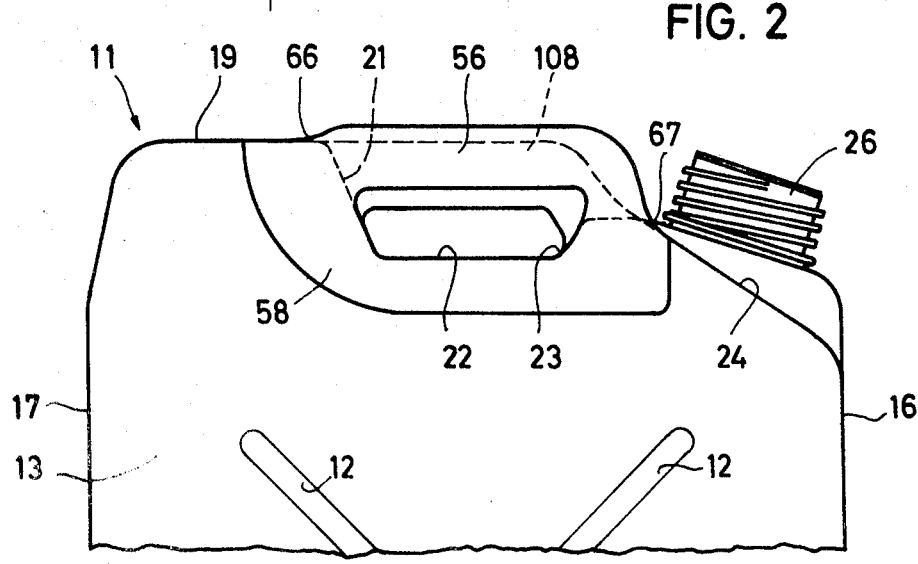
FIG. 2 shows a side view of the upper section of a standing container.

Some distance from the stem 112 and opposite the inner face of the latter a nose 118 extends parallel to the longitudinal axis 79 and is rigidly connected to the supporting plate 74. Its effective length corresponds to the distance between the front side 104 and the upper side 18. Extending concentrically with the recess 107 is a rib 119 which produces a corresponding notch 121 in the central handle 108, the displacement caused by the rib 119 being such that the central handle 108 is solidified and there are no resulting cavities leading to the interior of the container 11. As shown in FIG. 1, the face 122 indicated by cross-hatching corresponds in shape to the face 103 of the wedge 76 and the face 123 also indicated by cross-hatching to the face 104 of the sliding plate 102. Owing to the final tolerances in manufacture a narrow ridge can be seen between the two faces 122, 123 on the finished product.

The apparatus operates as follows: The handles 56,57 and the handle plates 58,59 are first laid into the recesses 63,64 and the split dies 29,30. The tube 28 in then extruded until it reaches the required length. Then the mandrel 42 is moved upwards in the direction of the arrow 43 and the die sections 29,30 towards one another in the direction of the arrows 31. At the same time the air pressure on the other side of the cylinder of the rod 87 of the two devices 46,47 is reduced so that the wedge 76 can be moved upwards by the helical springs 86 and the ring sleeve 92. If the pressure on the upper side of the cylinder of the rod 87 has completely terminated, the head of the stay bolt 94 bears against the supporting plate 74, the ring sleeve 92 slides completely upwards on the telescopic bush 89, as shown in the left-hand section of FIG. 6, and the sliding plate 102 is also moved upwards by the same distance on account of the nose 118. In this connection the sliding plates 102 have been moved slightly towards one another owing to the wedge 76 being guided parallel to the longitudinal axis 79 and now occupy their uppermost position, but their upper sections are spaced too far apart from one another to nip the material 111 and form the central handle 108. However, the pressure which is then formed on the lower side of the cylinder of the rod 87 drives the wedge 76 upwards even to the height of the still stationary sliding plate 102, until it has occupied its upper end position shown in the left-hand section of FIG. 6. In this connection the wedge 76 assume several functions; it pushes the associated sliding plate 102 in the direction of the dividing plane 44 into its end position. It seals the recess 64 from the outside so that the handle 57 is securely positioned. It supports the inner edge 62 of the handle plate 95 against the moulding pressure which is approximately 10 atmospheres. It also secures the sliding plate 102 to prevent a downward movement due to the blow moulding pressure so that the helical springs 96 do not have to absorb any load, the wedge pushing the lower face of the stem 112 on the last part of its travel onto the upper face of the nose 118 so that an arrangement is obtained as shown in the left hand section of FIG. 6. The recess 113 permits the necessary transverse movement of the sliding plate 102 in this section. The pressure in the squeezed off tube 28 which is caused by the mandrel 42 then increases so that the tube bears against its limiting walls, as shown in FIG. 6. In this connection it is welded permanently to the handle plates 58,59 which are still sufficiently hot. Because of the rib 119 no air is blown into the central handle 108 and even at this point the central handle 108 which consists of two tubular sections is compressed into a homogeneous form. After cooling time the reverse operation takes place: the wedge 76 moves downwards, the sliding plate 102 moves clear of the dividing plane 44, and is then subsequently moved by the wedge 76 on account of the nose 118, and the helical springs 96 are compressed. When the device 46,47 occupies the position shown on the right hand side on FIG. 6, the die sections 29,30 move apart, the container blank is ejected and dropped from the machine.

This apparatus is capable of numerous variations. If there is sufficient space available, the wedge 76 and the sliding plate 102, can be controlled by separate cylinders. In the case of larger containers, e.g. 30 liter containers, the distance between the central handle 108 and the adjacent handles 56, 57 is substantially greater so that the use of two wedges guided along one another is better for producing the lift of the sliding plate 102 perpendicular to the median plane 44.

The same material has been used for the tube 28 and the handles 56,57 as well as the handle plates 58,59. The handles 56,57 are solid.

The tube 49 is rapidly extruded and if extruded far enough, the die sections 29, 30 also close rapidly. In spite of this the outer layer of the tube 49 cools down and is too cold when bearing against the inner face 124 of the handle plates 58,59. The handle plates are inserted while hot. In spite of this it may happen that the weld between the tube 49 and the handle plates 58,59 is not as good as required if the handles 56, 57 of the container 11 have to be subjected to sudden stress. Such a stress occurs e.g. if the container is dropped by parachute and the parachute opens. In order to improve the weld is spite of the unavoidable cooling action and without involving complicated work, the inner faces of the handle plates 58, 59 are provided with small pointed cones 126 which lie close to one another and combine to give the appearance of the surface of a rough file. As shown in FIG. 10, the small cones 126 do not pass entirely through the wall which originated in the tube. However, they break through the outer face 127 of the tube at corresponding points and thus penetrate the still uncooled material inside the tube. The conical shape facilitates not only insertion but also welding, because the left volume the small cones 126 have, further they extend to the tip.

The small cones 126 also cause the air to escape between the tubular extrudate 49 and the inner face 124 so that no harmful dividing air pockets are formed between these parts. The two functions of the small cones 126 are of equal importance. The small cones 126 are produced by driving the moulding tool into the handles 56,57 and a center punch into the faces forming the inner face 124. Since the center punches are usually shaped like a circular cone, the small cones 126 will assume a corresponding shape. However it is also possible to use small cones in the form of triangular pyramids square pyramids or the like. More-over, the small cones could even be replaced by ribs which are triangular in cross-section and substantially parallel to one another so that the ribs do not interfere with the out flowing air, but nevertheless penetrate the tube 49.

What is claimed is:

1. Apparatus for manufacturing a container of plastic material having three handles also made of plastic material comprising a blow-moulding head which extrudes a hot tube of plastic material, blow-moulding sections to the side of said tube, open-edged recesses which are not undercut in the direction of the dividing plane of the blow-moulding sections produced in the lower inner marginal section of each blow-moulding section, a separately moulded outer handle and a handle plate being insertable into each of said recesses at a temperature at which the inner face of the plate is permanently welded to the hot extrudate, the outer face of the plate following the outer face of the container, the plate extending from one end of the outer handle to the other and also extending a little further along the side wall and the upper side of the container, the material of the tube being identical to that of the plates at least with regard to the welding properties at blow-moulding temperatures, the bottom of each of the blow-moulding sections being provided with half of a recess for a container outlet and for the central handle, below the blow-moulding sections there are provided two sliding devices which are substantially symmetrical with the dividing plane and can be jointly operated subject to the closing of the blow-moulding sections and the blow-moulding time, each of said sliding devices comprising a sliding plate of which the upper sections are directed towards one another and each comprises a first recess to form the central handle and an upper second recess for squeezing off and receiving the surplus extrudate between the central handle and the upper side of the container, the upper faces of the sliding plates being movable towards one another between the outer handles and the tube being flattened as far as the upper side of the container by the closing operation when the blow-moulding operation commences, the sliding plates being lockable in this position.

2. Apparatus as claimed in claim 1, in which each sliding device comprises a wedge, the outer side of which is longitudinally slidably guided by a guide on a frame which can be attached to the blow-moulding sections in the direction of the half recess in the central handle in that the guide is inclined outwards at an acute angle, the upper face of the wedge, when in its upwardly displaced position bears against the upper side of the container at least on the plate, and the central handle and its outer side holds the outer handle in its recess, the inner side of the wedge comprises a second guide for the sliding plate extending approximately parallel to the dividing plane, the sliding plate projects for a considerable distance above the wedge when in a withdrawn position, when moving into the working position the wedge and the sliding plate can be jointly moved as far as the end position of the sliding plate and then the wedge alone into its end position.

3. Apparatus as claimed in claim 1, in which the center of the first recess provided in the sliding plate is provided with a rib which compresses the center of the central handle to remove any cavities.

4. Apparatus as claimed in claim 1, in which the locking means comprises a nose fixed to the frame, against which nose the lower face of the sliding plate bears when in its upper end position.

5. Apparatus as claimed in claim 2, in which the upper faces of the wedge and the sliding plate are approximately equal in width.

6. Apparatus as claimed in claim 1, in which the inner faces of the handle plate comprises a plurality of elevated sections which do not penetrate the adjacent wall section of the blow-moulded plastic material, but break through the outer face of the extrudate at this point.

7. Apparatus as claimed in claim 6, in which the elevated sections are small cones, and preferably circular cones.

8. Apparatus as claimed in claim 7, in which the elevated sections are negative copies reproduced by the impact of center punches in the moulding tool of the handles.

* * * * *